United States Patent
Shinke et al.

(10) Patent No.: US 10,480,997 B1
(45) Date of Patent: Nov. 19, 2019

(54) OPTICAL MEASUREMENT APPARATUS AND OPTICAL MEASUREMENT METHOD

(71) Applicant: Otsuka Electronics Co., Ltd., Osaka (JP)

(72) Inventors: Toshiki Shinke, Osaka (JP); Shiro Kawaguchi, Osaka (JP); Nobuyuki Inoue, Osaka (JP)

(73) Assignee: Otsuka Electronics Co., Ltd., Osaka (JP)

(*) Notice: Subject to any disclaimer, the term of this patent is extended or adjusted under 35 U.S.C. 154(b) by 0 days.

(21) Appl. No.: 16/414,798

(22) Filed: May 17, 2019

(30) Foreign Application Priority Data

May 18, 2018 (JP) ................... 2018-096422

(51) Int. Cl.
- *G01J 3/28* (2006.01)
- *G01J 3/02* (2006.01)
- *G02B 27/09* (2006.01)
- *G01J 3/46* (2006.01)

(52) U.S. Cl.
CPC ............. *G01J 3/0254* (2013.01); *G01J 3/46* (2013.01); *G02B 27/0977* (2013.01)

(58) Field of Classification Search
CPC .... G01J 3/0254; G01J 3/46; G01J 3/28; G01J 3/26; G01J 3/02; G02B 27/0977; G01B 11/24; G01B 11/14
See application file for complete search history.

(56) References Cited

U.S. PATENT DOCUMENTS

| 2010/0144052 A1* | 6/2010 | Pi .................... G01N 21/253 436/164 |
| 2015/0106057 A1 | 4/2015 | Sugita et al. |

FOREIGN PATENT DOCUMENTS

| JP | 2009-092454 A | 4/2009 |
| JP | 2015-075452 A | 4/2015 |
| JP | 2018-004442 A | 1/2018 |

* cited by examiner

*Primary Examiner* — Abdullahi Nur
(74) *Attorney, Agent, or Firm* — HEA Law PLLC (57) ABSTRACT

An optical measurement apparatus includes: a probe including a transmissive optical member having a reference surface, the probe being configured to irradiate a sample with light through the reference surface, and receive a first reflected light from the reference surface, a second reflected light from a front side of the sample, and a third reflected light from a back side of the sample; and a calculator configured to calculate a first distance from the reference surface to the front side of the sample with use of a first reflection interference light to be generated by the first reflected light and the second reflected light, and to calculate a thickness of the sample with use of a second reflection interference light to be generated by the second reflected light and the third reflected light.

16 Claims, 11 Drawing Sheets

OPTICAL MEASUREMENT APPARATUS AND OPTICAL MEASUREMENT METHOD

CROSS-REFERENCE TO RELATED APPLICATION

The present application claims priority from Japanese application JP 2018-096422 filed on May 18, 2018, the content of which is hereby incorporated by reference into this application.

BACKGROUND

1. Field

The present invention relates to an optical measurement apparatus and an optical measurement method.

2. Description of the Related Art

In the related art, for example, in Japanese Patent Application Laid-open. No. 2009-92454, there is disclosed an optical measurement apparatus configured to calculate a film thickness of a sample by irradiating one surface of the sample with light from a probe and analyzing reflected light of the light from the probe.

However, the optical measurement apparatus in the related art has a problem in that a distance between the probe and the sample cannot be measured.

SUMMARY

The present disclosure has been made in view of the above-mentioned situation, and therefore has an object to measure, by an optical measurement apparatus, in which one surface of a sample is irradiated with light, a distance between a probe and the sample, and a film thickness of the sample.

In order to solve the above-mentioned problem, an optical measurement apparatus according to one embodiment of the present disclosure includes: a probe including a transmissive optical member having a reference surface, the probe being configured to irradiate a sample with light through the reference surface, and to receive a first reflected light from the reference surface, a second reflected light from a front side of the sample, and a third reflected light from a back side of the sample; and a calculator, which is configured to calculate a first distance from the reference surface to the front side of the sample with use of a first reflection interference light to be generated by the first reflected light and the second reflected light, and to calculate a thickness of the sample with use of a second reflection interference light to be generated by the second reflected light and the third reflected light.

Further, an optical measurement method according to one embodiment of the present disclosure is an optical measurement method, which is performed with use of a probe including a transmissive optical member having a reference surface, and includes: irradiating a sample with light through the reference surface with use of the probe; receiving, by the probe, a first reflected light from the reference surface, a second reflected light from a front side of the sample, and a third reflected light from a back side of the sample; calculating a first distance from the reference surface to the front side of the sample with use of a first reflection interference light to be generated by the first reflected light and the second reflected light; and calculating a thickness of the sample with use of a second reflection interference light to be generated by the second reflected light and the third reflected light.

DETAILED DESCRIPTION

First Embodiment

Referring to the accompanying drawings, a description is now given of a first embodiment of the present disclosure.

Figure 1:
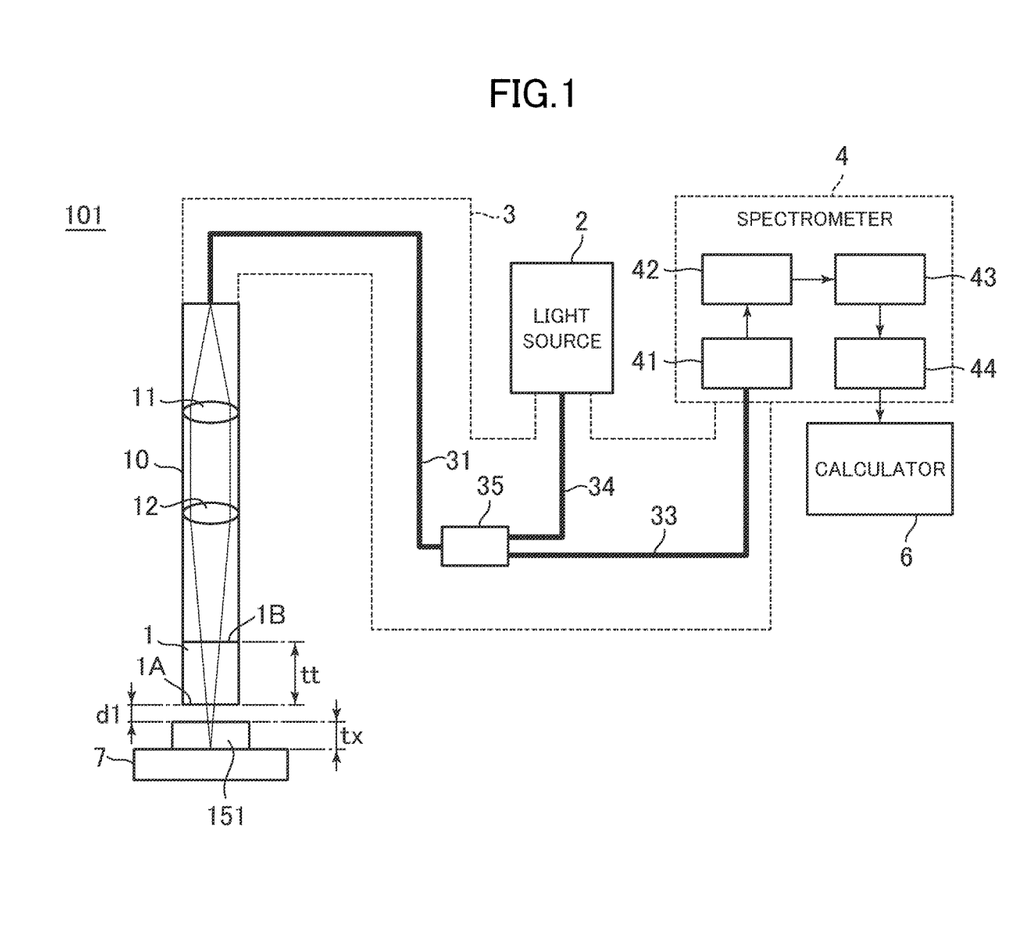
FIG. 1 is a schematic diagram for illustrating a schematic configuration of an optical measurement apparatus according to a first embodiment of the present disclosure.

FIG. 1 is a schematic diagram for illustrating a schematic configuration of an optical measurement apparatus 101 according to the first embodiment. As illustrated in FIG. 1, the optical measurement apparatus 101 according to the first embodiment includes a probe 10 including a transmissive optical member 1 having a reference surface 1A. The probe 10 is configured to irradiate a sample 151 with light through the reference surface 1A. The probe 10 is also configured to receive a first reflected light from the reference surface 1A, a second reflected light from a front side of the sample 151, and a third reflected light from a back side of the sample 151.

A first reflection interference light is generated by the first reflected light and the second reflected light, which have been received by the probe 10. Moreover, a second reflection interference light is generated by the second reflected light and the third reflected light, which have been received by the probe 10. The first reflection interference light and the second reflection interference light are transmitted to a calculator 6.

The calculator 6 is configured to calculate a first distance d1 from the reference surface 1A to the sample 151 with the use of the first reflection interference light. The calculator 6 is also configured to calculate a thickness tx of the sample 151 with the use of the second reflection interference light.

With the above-mentioned configuration, the optical measurement apparatus, which is configured to irradiate one surface of the sample 151 with the light, can measure the first distance d1 between the reference surface 1A of the probe 10 and the sample 151, and the thickness tx of the sample 151.

Moreover, because the irradiation of only the front side of the sample 151 with the light is sufficient, it is not required to arrange another probe on the back side of the sample 151. Therefore, it is not required to adjust a position of an optical axis of the probe 10 and a position of an optical axis of the probe on the back side. Further, because it is not required to arrange the probe on the back side, it is also not required to arrange the sample 151 to float in the space, and the space in which the probe is arranged on the back side of the sample 151 is also not required.

Now, a specific configuration of the optical measurement apparatus 101 according to the first embodiment including a freely selectable configuration is described.

As illustrated in FIG. 1, the optical measurement apparatus 101 according to the first embodiment includes, in addition to the configuration described above, a light source 2, an optical system 3, a spectrometer 4, a stage 7, and other components.

The optical system 3 includes optical fibers 31, 33, and 34, and a fiber junction 35. Light output by the light source 2 is transmitted to the fiber junction 35 through the optical fiber 34, and to the probe 10 through the optical fiber 31.

Incident light that has been transmitted through an end surface of the optical fiber 31 is converted into a parallel ray by a collimator lens 11 in the probe 10, and is condensed by a condenser lens 12. The probe 10 is configured to irradiate the sample 151 with the light that has been condensed by the condenser lens 12 through the reference surface 1A. In the first embodiment, the light with which the probe 10 irradiates the sample 151 has a wavelength that is transmitted through the sample 151. Therefore, the light with which the probe 10 irradiates the sample 151 reaches not only the front side of the sample 151 but also the back side of the sample 151. In the first embodiment, there is adopted a configuration in which the light source 2 is an amplified spontaneous emission (ASE) light source configured to generate incoherent light in a near-infrared range, and in which the light with which the probe 10 irradiates the sample 151 is the incoherent light in the near-infrared range.

The light with which the probe 10 irradiates the sample 151 is reflected by the reference surface 1A in the probe 10. The light reflected by the reference surface 1A is defined as the "first reflected light". The light with which the probe 10 irradiates the sample 151 is also reflected by the front side and the back side of the sample 151. The light reflected by the front side of the sample 151 is defined as the "second reflected light", and the light reflected by the back side of the sample 151 is defined as the "third reflected light".

The probe 10 is configured to receive the first reflected light from the reference surface 1A, the second reflected light from the front side of the sample 151, and the third reflected light from the back side of the sample 151.

In the first embodiment, the probe 10 has the condenser lens 12, and is adjusted so that focus is placed near the front side of the sample 151. Therefore, a measurement spot diameter can be reduced to enable measurement reflecting a distribution of fine front shapes of the sample 151. Moreover, the light with which to irradiate the sample 151 is condensed, and hence a reduction in amount of received light with respect to an amount of projected light can be suppressed. Because the reduction in amount of received light can be suppressed, measurement with short exposure time can be performed. Further, even when an optical axis of the probe 10 is not perpendicular to the front side of the sample 151, or even when flatness of the front side of the sample 151 is low, the reduction in amount of received light can be suppressed.

It is desired that a thickness tt of the transmissive optical member 1 be larger than the first distance d1. With the thickness tt of the transmissive optical member 1 being larger than the first distance d1, a degree of focus of the light with which the probe 10 irradiates the sample 151 can be reduced on a surface 1B opposite to the reference surface 1A of the transmissive optical member 1. As a result, an intensity of reflected light from the opposite surface 1B can be reduced, and interference of reflected light from the opposite surface 1B with the first reflected light, the second reflected light, and the third reflected light can be reduced.

It is also desired that an optical thickness obtained by multiplying the thickness tt of the transmissive optical member 1 by a refractive index of the transmissive optical member 1 be larger than an upper limit of a coherent optical thickness range of the spectrometer 4, which is to be described later. The upper limit of the coherent optical thickness range of the spectrometer 4 can be expressed by the following equation.

$$d_{max} = \frac{1}{2(k_1 - k_{min})} \quad \text{[Expression 1]}$$
$$= \frac{\lambda_{max} \cdot \lambda_1}{2(\lambda_{max} - \lambda_1)}$$
$$= \frac{\lambda_{max}\lambda_1}{4\Delta\lambda} \cong \frac{\lambda_{max}^2}{4\Delta\lambda}$$

In Expression 1, $d_{max}$ represents the upper limit value of the coherent optical thickness range, $\lambda_{max}$ represents an upper limit value of a measurement wavelength range of the spectrometer 4, $k_{min}$ represents a wave number corresponding to $\lambda_{max}$, and has the relationship: $k_{min}=1/\lambda_{max}$, $k_1$ represents a wave number that is in phase with $k_{min}$ in an interference waveform, and that is adjacent to $k_{min}$, $\lambda_1$ represents a wavelength corresponding to $k_1$, and has the relationship: $k_1=1/\lambda_1$, and $\Delta\lambda$ represents wavelength resolution, and can be expressed by the following equation.

$$\Delta\lambda = \frac{\lambda_{max} - \lambda_{min}}{S_p} \quad \text{[Expression 2]}$$

Figure 11:
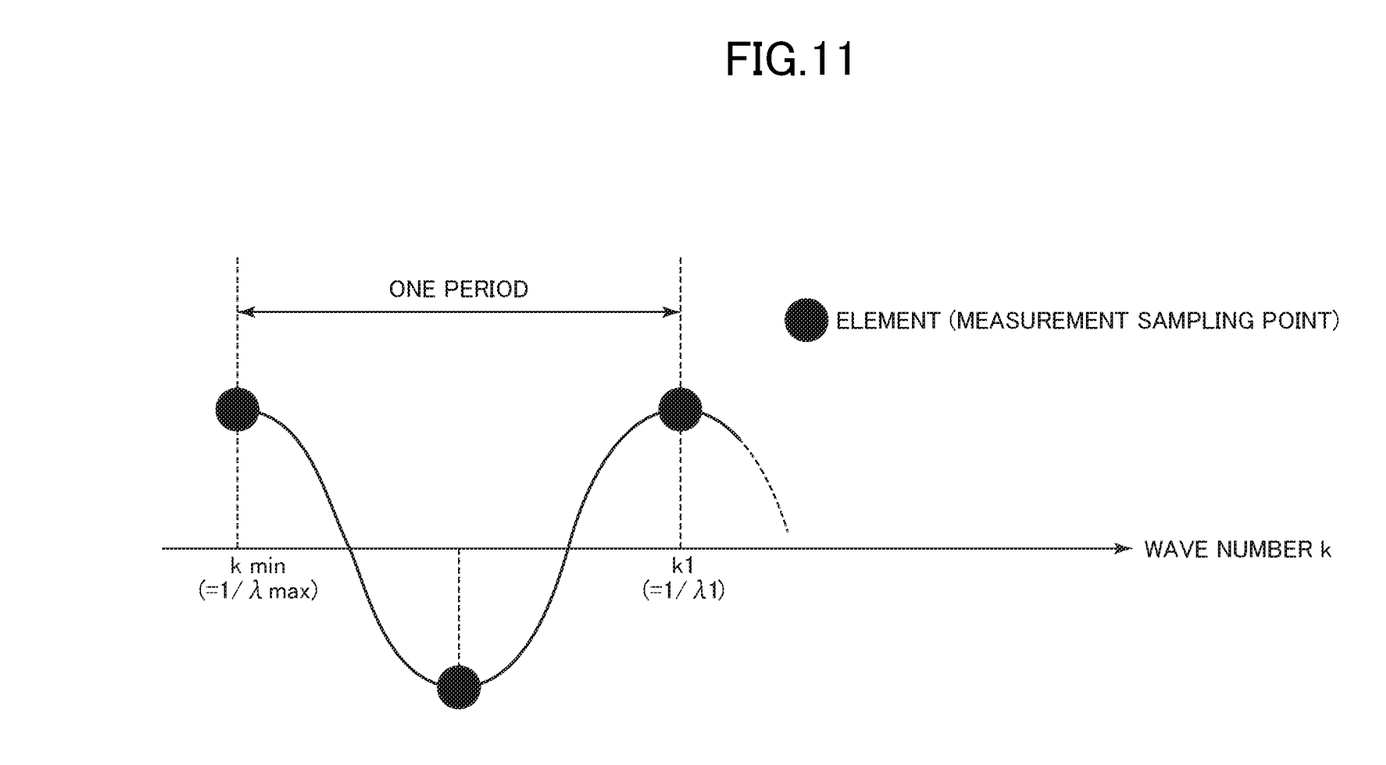
FIG. 11 is a schematic graph for showing a relationship between a period of an interference waveform and an element pitch of a linear image sensor, which is obtained when a sample having an optical thickness that is an upper limit value of a coherent optical thickness is measured.

In Expression 2, $S_p$ represents the number of elements of a linear image sensor in a detector 44, which is to be described later, $\lambda_{max}$ represents the upper limit value of the measurement wavelength range of the spectrometer 4, and $\lambda_{min}$ represents a lower limit value of the measurement wavelength range of the spectrometer 4. FIG. 11 is a schematic graph for showing a relationship between a period of the interference waveform and an element pitch (interval between sampling points) of the linear image sensor obtained when a sample having an optical thickness that is the upper limit value $d_{max}$ of a coherent optical thickness is measured with the use of the spectrometer 4. Referring to FIG. 11, Expression 1 is calculated such that one period of the interference waveform in a reflectance spectrum becomes data corresponding to two adjacent elements of the linear image sensor in the detector 44. Therefore, $d_{max}$ can be interpreted as the largest possible optical thickness that satisfies the Nyquist sampling theorem in frequency analysis.

It is desired that the opposite surface 1B be applied with anti-reflection coating, or that the opposite surface 1B be arranged so as to obliquely intersect the optical axis of the probe 10. Through adoption of such a configuration, interference of the reflected light from the opposite surface 1B with the first reflected light, the second reflected light, and the third reflected light can be reduced.

It is desired that the end surface of the optical fiber 31 to be attached to the probe 10 be angled physical contact (APC) polished into an angled spherical surface. By being APC polished into the angled spherical surface, the end surface of the optical fiber 31 can reduce interference of the light reflected by the end surface of the optical fiber 31 with the first reflected light, the second reflected light, and the third reflected light.

The first reflection interference light is generated by the first reflected light and the second reflected light, which have been received by the probe 10. Moreover, the second reflection interference light is generated by the second reflected light and the third reflected light. Measurement reflected light including the first reflection interference light and the second reflection interference light is transmitted to the spectrometer 4 through the optical fiber 31, the fiber junction 35, and the optical fiber 33.

The spectrometer 4 is configured to measure a reflectance spectrum of the measurement reflected light, and output a result of the measurement to the calculator 6. The spectrometer 4 includes a shutter 41, a cut-off filter 42, a diffraction grating 43, and the detector 44.

The shutter 41 is provided to shut the light entering the detector 44 when the detector 44 is reset, for example. The shutter 41 is a mechanical shutter to be driven by electromagnetic force, for example.

Figure 10:
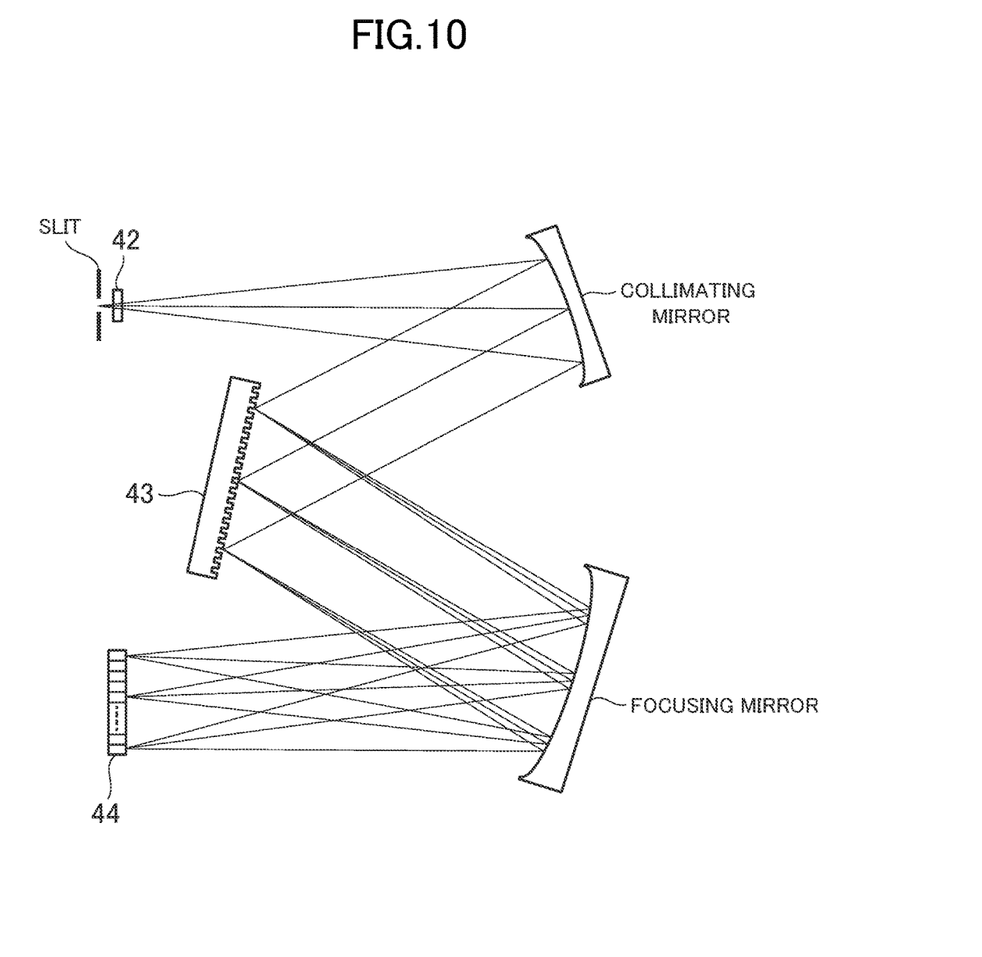
FIG. 10 is a schematic view for illustrating the internal structure of a spectrometer of the optical measurement apparatus according to the first embodiment.

The cut-off filter 42 is an optical filter configured to cut off wavelength components outside a measurement range included in the measurement reflected light that enters the spectrometer 4. As illustrated in FIG. 10, the cut-off filter 42 cuts off stray light generated near a lower limit of the measurement wavelength range of the spectrometer 4 of the measurement reflected light that has entered through a slit. In the first embodiment, the cut-off filter 42 cuts off wavelengths of about 1,000 nm or less, for example. As a result, only first-order light of the diffraction grating 43 can be transmitted and higher-order light can be cut off, with the result that occurrence of a measurement failure due to superimposition of higher-order diffracted light can be reduced in the spectrometer 4. The measurement reflected light that has been transmitted through the cut-off filter 42 is reflected by a collimating mirror, for example, and enters the diffraction grating 43.

The diffraction grating 43 splits the measurement reflected light including the first reflection interference light and the second reflection interference light, and guides each split light wave to the detector 44. Specifically, the diffraction grating 43 is a reflection-type refractive grating, and is configured to reflect a diffracted wave of each predetermined wavelength interval in a corresponding direction. When the measurement reflected light enters the diffraction grating 43 having the above-mentioned configuration, each wavelength component included therein is reflected in the corresponding direction to enter a predetermined detection region of the detector 44. The diffraction grating 43 is formed of a blazed holographic plane grating, for example. As illustrated in FIG. 10, there may be adopted a configuration in which a focusing mirror is interposed between the diffraction grating 43 and the detector 44, and in which the measurement reflected light reflected by the diffraction grating 43 is further reflected by the focusing mirror to enter the detector 44.

As the detector 44, for example, there is used a linear image sensor in which a plurality of elements having sensitivity in a near-infrared band are linearly arranged. The detector 44 is configured to output, to the calculator 6, an electrical signal corresponding to a light intensity of each wavelength component included in the measurement reflected light split by the diffraction grating 43.

When the calculator 6 receives the electrical signal from the detector 44, the calculator 6 transforms an intensity of each wavelength indicated by the electrical signal to a reflectance of each wavelength to generate the reflectance spectrum or transmittance spectrum.

Moreover, the calculator 6 holds, as dark spectrum data, an intensity of each wavelength indicated by the electrical signal received from the detector 44 under a state in which no light enters the spectrometer 4, for example.

Further, the calculator 6 holds, as reference spectrum data, an intensity of each wavelength obtained by subtracting the intensity of each wavelength included in the dark spectrum data from an intensity of each wavelength indicated by an electrical signal received from the detector 44 under a state in which a reference object, for example, an aluminum plate, is placed on the stage 7, for example.

The calculator 6 subtracts the intensity of each wavelength included in the dark spectrum data from an intensity of each wavelength indicated by an electrical signal received from the detector 44 under a state in which the sample 151 is placed on the stage 7, and then divides the result by the intensity of each wavelength included in the reference spectrum data, to thereby generate reflectance spectrum data or transmittance spectrum data of each wavelength.

Figure 3:
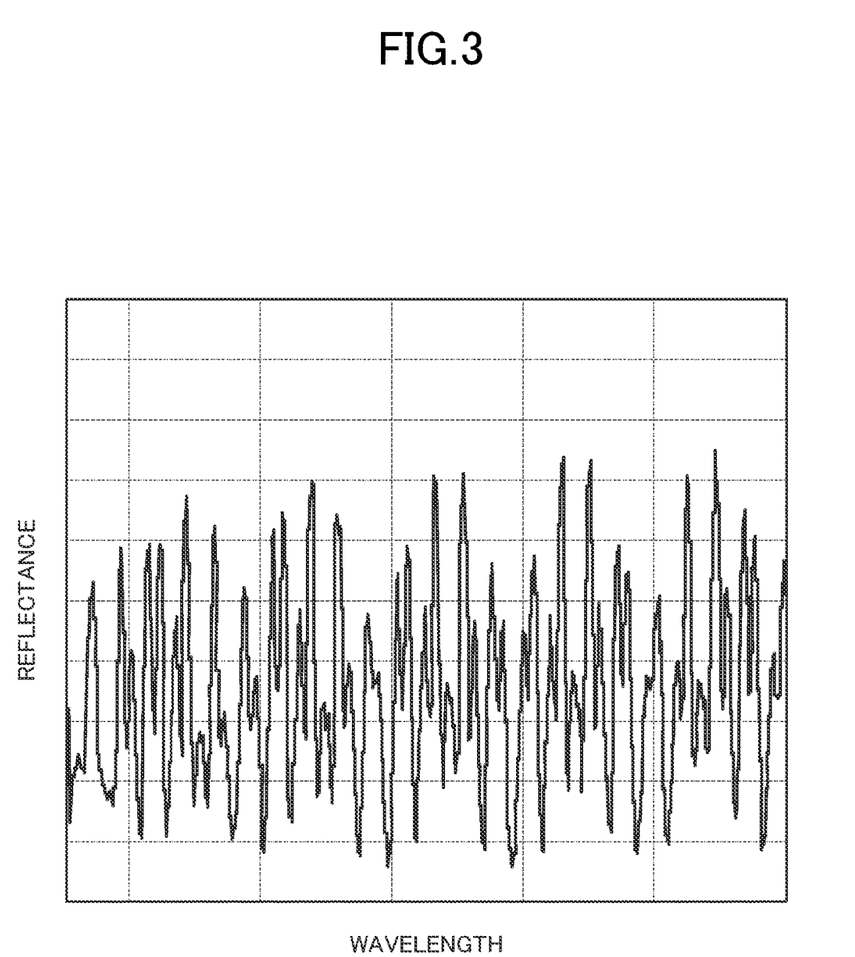
FIG. 3 is a schematic graph for showing a reflectance spectrum acquired by the optical measurement apparatus according to the first embodiment.

In the first embodiment, a description is given of an example in which the calculator 6 acquires such a reflectance spectrum as shown in FIG. 3. In the reflectance spectrum shown in FIG. 3, the horizontal axis indicates the wavelength, and the vertical axis indicates the reflectance. As described above, the measurement reflected light includes the first reflection interference light to be generated by the first reflected light and the second reflected light, and the second reflection interference light to be generated by the second reflected light and the third reflected light. Therefore, the reflectance spectrum or transmittance spectrum contains information on the first reflection interference light and the second reflection interference light.

Figure 4:
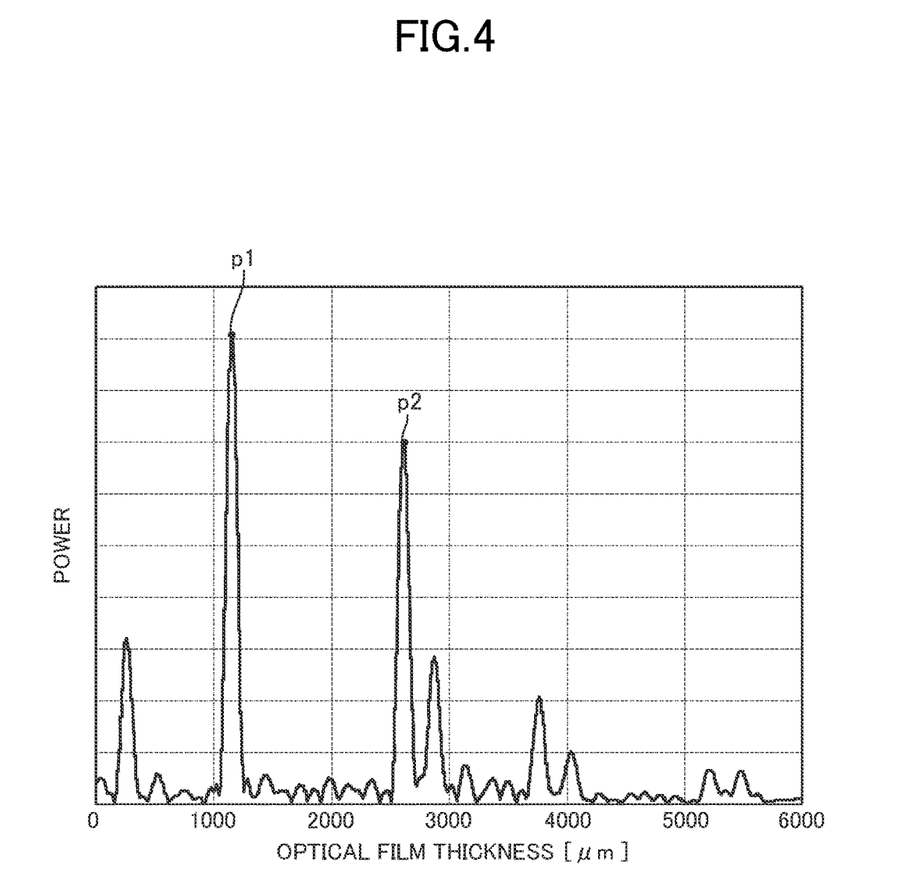
FIG. 4 is a schematic graph for showing a power spectrum acquired by the optical measurement apparatus according to the first embodiment.

The calculator 6 calculates the first distance d1, and the thickness tx of the sample 151 with the use of the generated reflectance spectrum (or transmittance spectrum). In the first embodiment, the horizontal axis of the reflectance spectrum (or transmittance spectrum) acquired from the spectrometer 4 is transformed to a wave number, and the vertical axis is transformed to a wave number-transformed reflectance (or wave number-transformed transmittance) to obtain a wave number-converted reflectance spectrum (or wave number-transformed transmittance spectrum). Thereafter, the wave number-converted reflectance spectrum (or wave number-transformed transmittance spectrum) is Fourier-transformed for the wave number to obtain such a power spectrum of each frequency component as shown in FIG. 4. When the thickness tx of the sample 151 is calculated, film-thickness calculation taking into consideration the dependence of the refractive index of the sample 151 on the wavelength may be performed. In other words, when the horizontal axis of the reflectance spectrum is transformed from the wavelength to the wave number, the wave number is calculated based on a refractive index value and a wavelength value of each wavelength of the sample, and the vertical axis is transformed from a reflectance R to a wave number-transformed reflectance R'=R/(1−R), or from a transmittance T to a wave number-transformed transmittance T'=1/T. When the wave number-converted reflectance spectrum (or wave number-transformed transmittance spectrum) obtained by the transform is Fourier-transformed for the wave number, the thickness tx taking into consideration the dependence of the refractive index of the sample 151 on the wavelength can be calculated with higher accuracy. As a highly-accurate film-thickness calculation method taking into consideration the dependence of the refractive value on the wavelength, the method described in Japanese Patent Application Laid-open No. 2009-92454 can be used, for example.

As described above, the reflectance spectrum or transmittance spectrum measured by the detector 44 contains the above-mentioned information on the first reflection interference light and the second reflection interference light. Therefore, in the power spectrum shown in FIG. 4, a first peak p1 based on the first reflection interference light, and a second peak p2 based on the second reflection interference light appear. The first peak p1 indicates information on the first distance d1 between the reference surface 1A of the probe 10 and the sample 151, and the second peak p2 indicates information on the thickness tx of the sample 151. In the power spectrum shown in FIG. 4, the horizontal axis indicates an optical film thickness. Therefore, for the first distance d1 indicating a distance in the air, a value itself of the optical film thickness at the first peak p1 shown in FIG. 4 indicates the first distance d1. Meanwhile, for the thickness tx of the sample 151, a value obtained by dividing a value of the optical film thickness at the second peak p2 shown in FIG. 4 by a refractive index of the sample 151 indicates the thickness tx.

With the above-mentioned configuration, in the optical measurement apparatus 101, in which the one surface of the sample 151 is irradiated with the light, the first distance d1 between the reference surface 1A of the probe 10 and the sample 151, and the thickness tx of the sample 151 can be measured.

Figure 2A:
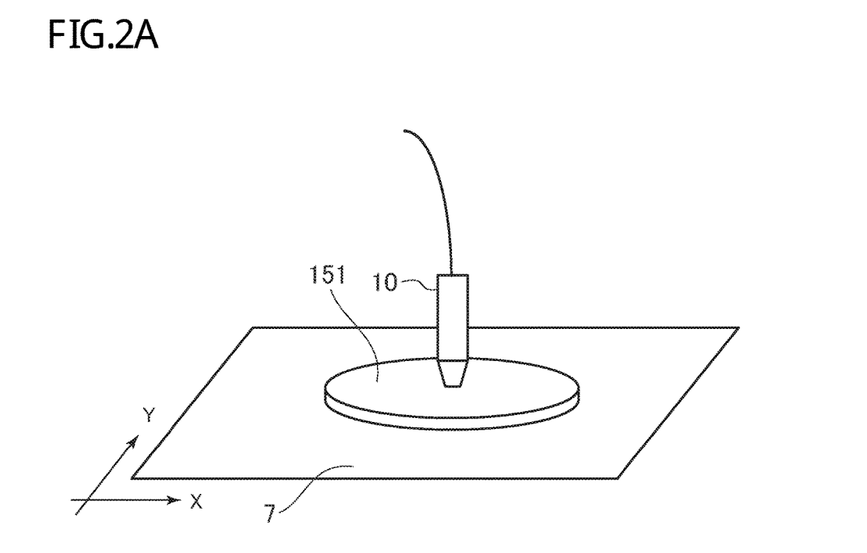
FIG. 2A is a schematic view for illustrating an arrangement relationship of a stage and a probe in the optical measurement apparatus according to the first embodiment.

There may be adopted a configuration in which at least one of the stage 7, on which the sample 151 illustrated in FIG. 2A is placed, or the probe 10 is moved in a first direction (for example, X-axis direction of the stage 7), which intersects the optical axis of the probe 10, and the probe 10 irradiates the sample with the light to receive the second reflected light and the third reflected light at a plurality of positions in the first direction. There may be adopted a configuration in which the calculator 6 then calculates the first distance d1 and the thickness tx of the sample 151, which have been described above, at the plurality of positions in the first direction.

With the above-mentioned configurations, information on front and back shapes of the sample 151 on a desired segment can be acquired. In other words, through the acquisition of the first distance d1 between the reference surface 1A of the probe 10 and the front side of the sample 151 at the plurality of positions in the first direction, the information on the front shapes of the sample 151 on the desired segment can be acquired. Further, through acquisition of the thickness tx of the sample 151 on the same segment, information on the back shape of the sample 151 can be acquired based on the first distance d1 and the thickness tx. As a result, a position of a flaw or dent formed on the front and back sides of the sample 151 on the desired segment can be acquired.

Further, there may be adopted a configuration in which the at least one of the stage 7 or the probe 10 illustrated in FIG. 2A may be moved not only in the first direction, but also in a second direction (for example, Y-axis direction of the stage 7), which intersects the optical axis direction of the probe 10 and intersects the first direction, and in which the probe 10 irradiates the sample 151 with the light to receive the second reflected light and the third reflected light at a plurality of positions in the first direction and the second direction. There may be adopted a configuration in which the calculator 6 then calculates the first distance d1 and the thickness tx of the sample 151 at the plurality of positions in the second direction.

With the above-mentioned configuration, information on front and back shapes of the sample 151 on a desired plane can be acquired. In other words, through the acquisition of the first distance d1 between the reference surface 1A of the probe 10 and the front side of the sample 151 at the plurality of positions in the first direction and the second direction, the information on the front shapes of the sample 151 on the desired plane can be acquired. Further, through acquisition of the thickness tx of the sample 151 on the same plane, information on the back shape of the sample 151 can be acquired based on the first distance d1 and the thickness tx. As a result, a position of a flaw or dent formed on the front and back sides of the sample 151 on the desired plane can be acquired.

Figure 2B:
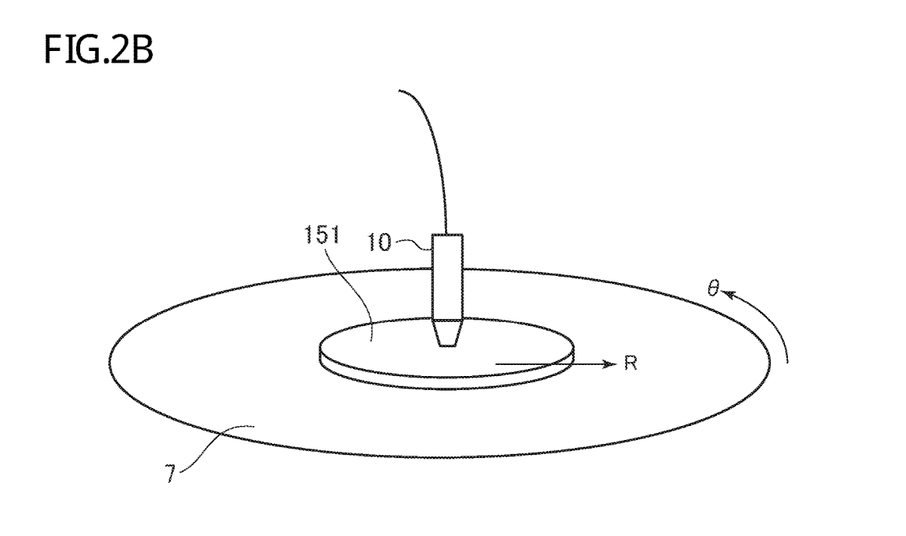
FIG. 2B is a schematic view for illustrating an arrangement relationship of the stage and the probe in the optical measurement apparatus according to the first embodiment.

As an example in which the information on front and back shapes of the sample 151 on the desired plane is acquired, the example in which at least one of the stage 7 or the probe 10 is moved in the X-axis direction and the Y-axis direction of the stage 7 has been given as an example, but the present disclosure is not limited thereto. For example, there may be adopted a configuration in which, as illustrated in FIG. 2B, the probe 10 below which the sample 151 is placed is moved in a radial direction R (first direction) from the center of the stage 7, and at the same time, the stage 7 is moved in a circumferential direction 6 (second direction).

Figure 5:
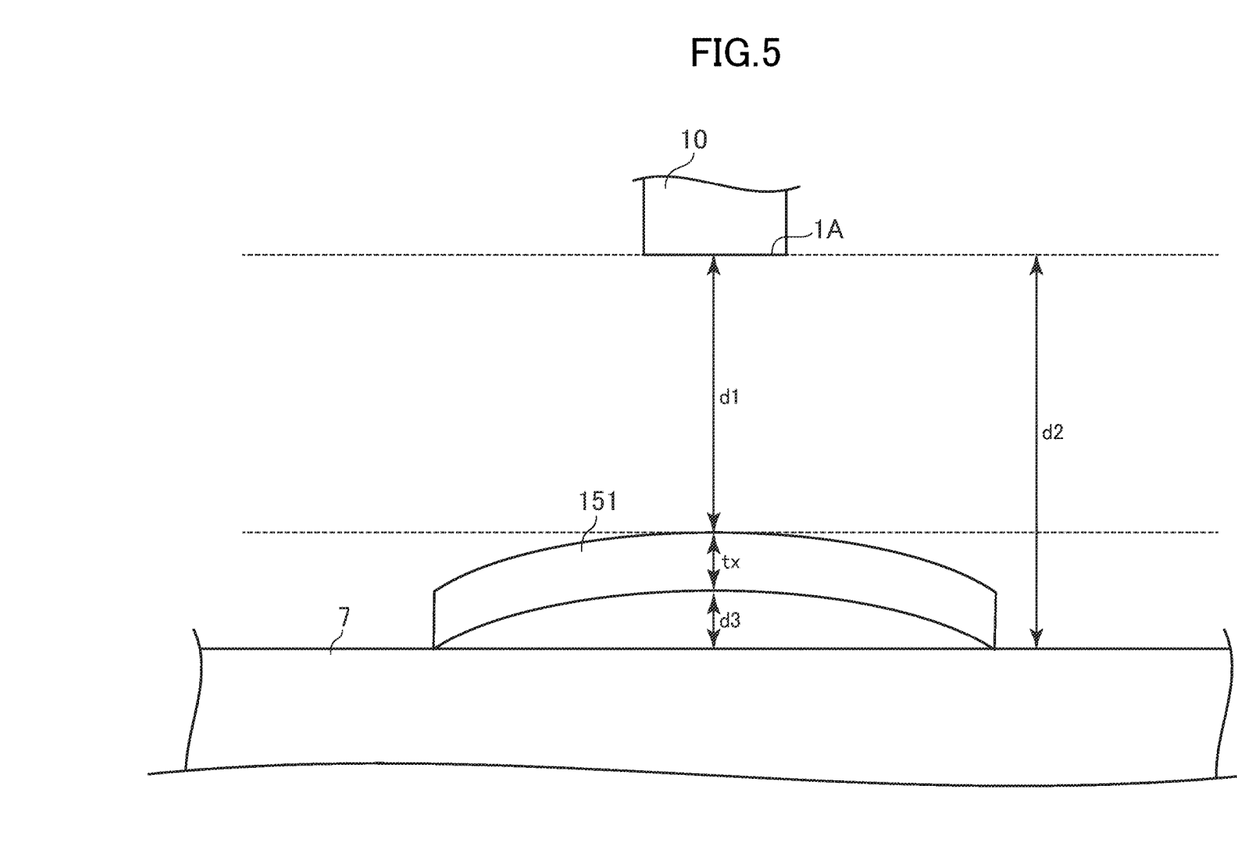
FIG. 5 is a schematic view for illustrating an arrangement relationship among the stage, the probe, and a sample in the optical measurement apparatus according to the first embodiment.
Figure 6:
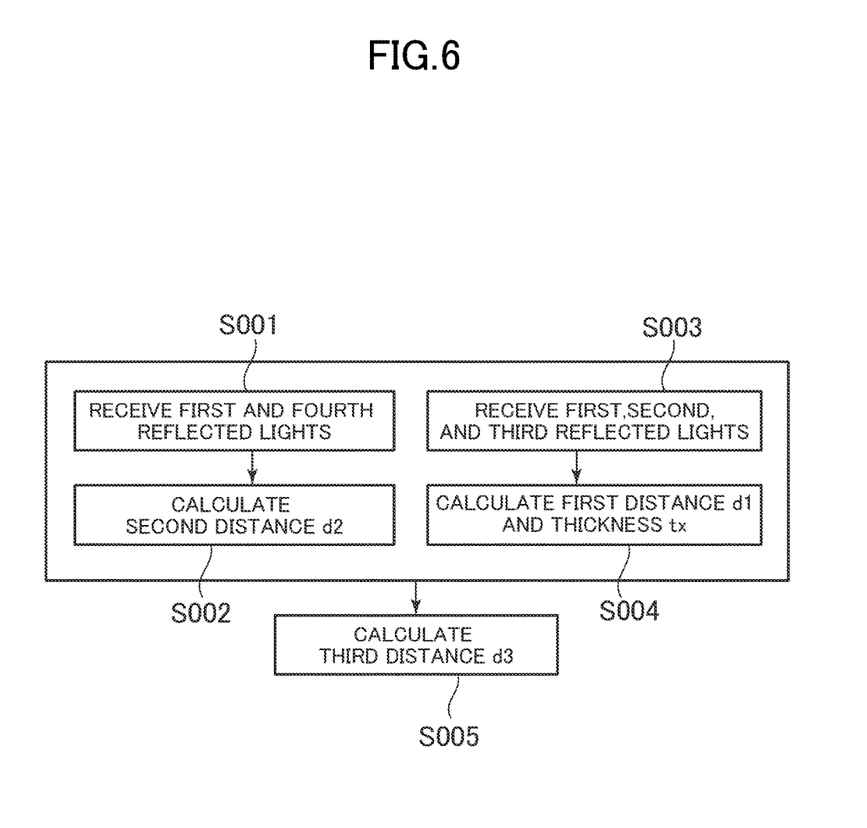
FIG. 6 is a flowchart for illustrating a method of calculating a third distance in an optical measurement method according to the first embodiment.

When the sample 151 is warped as illustrated in FIG. 5, a space may be generated between the sample 151 and the stage 7. Now, a method of calculating a third distance d3 between the sample 151 and the stage 7 is described. FIG. 6 is a flow chart for illustrating the method of calculating the third distance in an optical measurement method according to the first embodiment.

First, in a first step S001, under a state in which the sample 151 is not placed on the stage 7, the probe 10 irradiates the stage 7 with light through the reference surface 1A. The probe 10 receives a fourth reflected light from a surface of the stage 7. Moreover, the probe 10 receives the first reflected light from the reference surface 1A.

Then, in a second step S002, the calculator 6 calculates a second distance d2 from the reference surface 1A to the stage 7 with the use of a third reflection interference light to be generated by the first reflected light and the fourth reflected light. Now, a method of calculating the second distance d2 is described.

The detector 44 is configured to output to the calculator 6 an electrical signal corresponding to a light intensity of each wavelength component included in the measurement reflected light including the third reflection interference light split by the diffraction grating 43.

When the calculator 6 receives the electrical signal from the detector 44, the calculator 6 transforms an intensity of each wavelength indicated by the electrical signal to a reflectance of each wavelength to generate the reflectance spectrum or transmittance spectrum.

Figure 7:
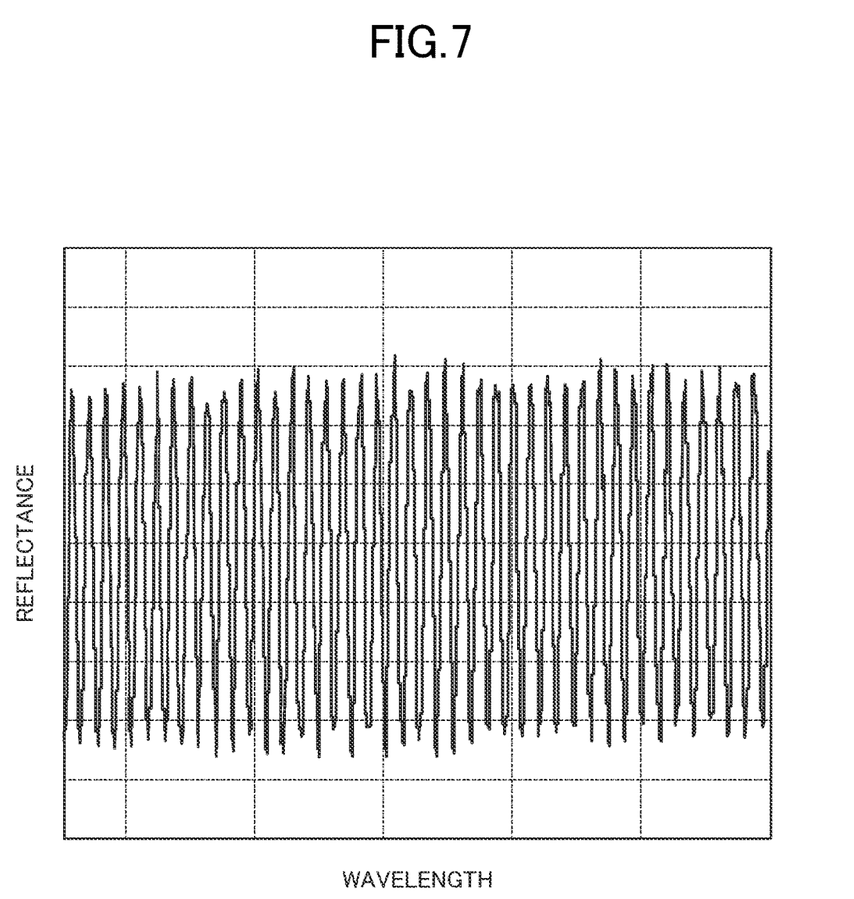
FIG. 7 is a schematic graph for showing a reflectance spectrum acquired by the optical measurement apparatus according to the first embodiment.

In the first embodiment, a description is given of an example in which the calculator 6 acquires such a reflectance spectrum as shown in FIG. 7. As described above, the measurement reflected light includes the third reflection interference light to be generated by the first reflected light and the fourth reflected light. Therefore, the reflectance spectrum or transmittance spectrum contains information on the third reflection interference light.

Figure 8:
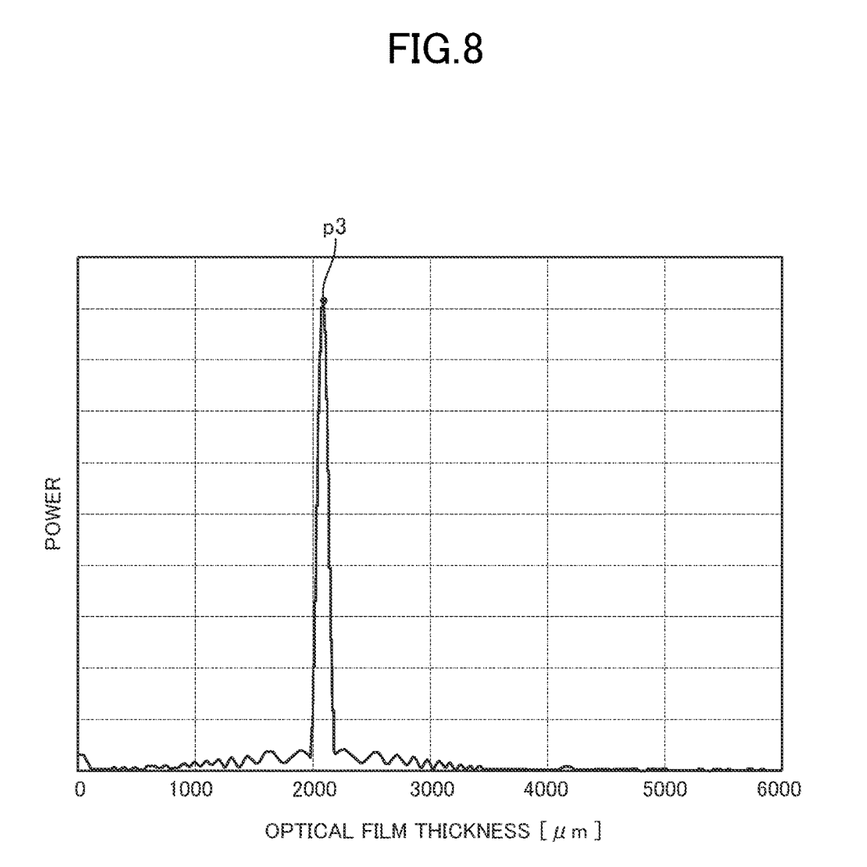
FIG. 8 is a schematic graph for showing a power spectrum acquired by the optical measurement apparatus according to the first embodiment.

The calculator 6 calculates the second distance d2 from the reference surface 1A to the stage 7 with the use of the generated reflectance spectrum (or transmittance spectrum). In the first embodiment, the horizontal axis of the reflectance spectrum (or transmittance spectrum) acquired from the spectrometer 4 is transformed to a wave number, and the vertical axis is transformed to a wave number-transformed reflectance (or wave number-transformed transmittance) to obtain a wave number-converted reflectance spectrum (or wave number-transformed transmittance spectrum). Thereafter, the wave number-converted reflectance spectrum (or wave number-transformed transmittance spectrum) is Fourier-transformed for the wave number to obtain such a power spectrum of each frequency component as shown in FIG. 8. When the thickness tx of the sample 151 is calculated, film-thickness calculation taking into consideration the dependence of the refractive index of the sample 151 on the wavelength may be performed. In other words, when the horizontal axis of the reflectance spectrum is transformed from the wavelength to the wave number, the wave number is calculated based on a refractive index value and a wavelength value of each wavelength of the sample 151, and the vertical axis is transformed from a reflectance R to a wave number-transformed reflectance $R'=R/(1-R)$, or from a transmittance T to a wave number-transformed transmittance $T'=1/T$. When the wave number-converted reflectance spectrum (or wave number-transformed transmittance spectrum) obtained by the transform is Fourier-transformed for the wave number, the thickness tx taking into consideration the dependence of the refractive index of the sample 151 on the wavelength can be calculated with higher accuracy. As a specific highly-accurate film-thickness calculation method taking into consideration the dependence of the refractive value on the wavelength, the method described in Japanese Patent Application Laid-open No. 2009-92454 can be used, for example.

As described above, the reflectance spectrum or transmittance spectrum generated by the calculator 6 contains the information on the third reflection interference light. Therefore, in the power spectrum shown in FIG. 8, a third peak p3 based on the third reflection interference light appears. The third peak p3 indicates information on the second distance d2 between the reference surface 1A of the probe 10 and the stage 7. In the power spectrum shown in FIG. 8, the horizontal axis indicates an optical film thickness. Therefore, for the second distance d2 indicating a distance in the air, a value itself of the optical film thickness at the third peak p3 shown in FIG. 8 indicates the second distance d2.

Then, in a third step S003, under a state in which the sample 151 is placed on the stage 7, the probe 10 irradiates the sample 151 with light through the reference surface 1A. The probe 10 receives the second reflected light from the front side of the sample 151, and receives the third reflected light from the back side of the sample 151. Moreover, the probe 10 receives the first reflected light from the reference surface 1A.

Then, in a fourth step S004, the calculator 6 calculates the first distance d1 from the reference surface 1A to the front side of the sample 151 with the use of the first reflection interference light to be generated by the first reflected light and the second reflected light, and calculates the thickness tx of the sample 151 with the use of the second reflection interference light to be generated by the second reflected light and the third reflected light.

The third step S003 and the fourth step S004 may be performed prior to the first step S001 and the second step S002.

Alternatively, after the first step S001 and the third step S003 are first performed, the second step S002 and the fourth step S004 may be performed at once.

Finally, in a fifth step S005, the calculator 6 calculates the third distance d3 between the sample 151 and the stage 7 with the second distance d2 illustrated in FIG. 5 being an additive element, and with the first distance d1 and the thickness tx of the sample 151 being subtractive elements.

With the optical measurement method as described above, in the optical measurement apparatus, in which the one surface of the sample 151 is irradiated with light, the third distance d3 between the sample 151 and the stage 7 can be measured.

In the first step S001, there may be adopted the method in which at least one of the stage 7 or the probe 10 illustrated in FIG. 2A and FIG. 2B is moved in the first direction (for example, the X-axis direction of the stage, or the radial direction), and the probe 10 irradiates the stage 7 with light to receive the fourth reflected light at the plurality of positions in the first direction.

Then, in the third step S003, there may be adopted the method in which at least one of the stage 7 or the probe 10 illustrated in FIG. 2A and FIG. 2B is moved in the first direction, and the probe 10 irradiates the sample 151 with light to receive the second reflected light and the third reflected light at the plurality of positions corresponding to the positions at which the fourth reflected light is received.

Through adoption of the above-mentioned method, in the fifth step S005, the calculator 6 calculates the thickness tx of the sample 151, the first distance d1, the second distance d2, and the third distance d3 at the plurality of positions in the first direction. As a result, information on the warp of the sample 151 on the desired segment can be acquired.

In the third step S003, there may be adopted a configuration in which, in order for the probe 10 to receive the second reflected light and the third reflected light at the plurality of positions corresponding to the positions at which the fourth reflected light is received, the calculator 6 stores the positions at which the fourth reflected light is received in the first step S001.

Further, the third step S003 may be performed prior to the first step S001. In that case, there may be adopted a configuration in which the calculator 6 stores the positions at which the second reflected light and the third reflected light are received in the third step S003.

Through adoption of the above-mentioned configuration, the light receiving positions in the first step S001 and the light receiving positions in the third step S003 can be associated with each other. In other words, in the third step S003, the second reflected light and the third reflected light can be received at the plurality of positions corresponding to the positions at which the fourth reflected light is received.

Figure 9:
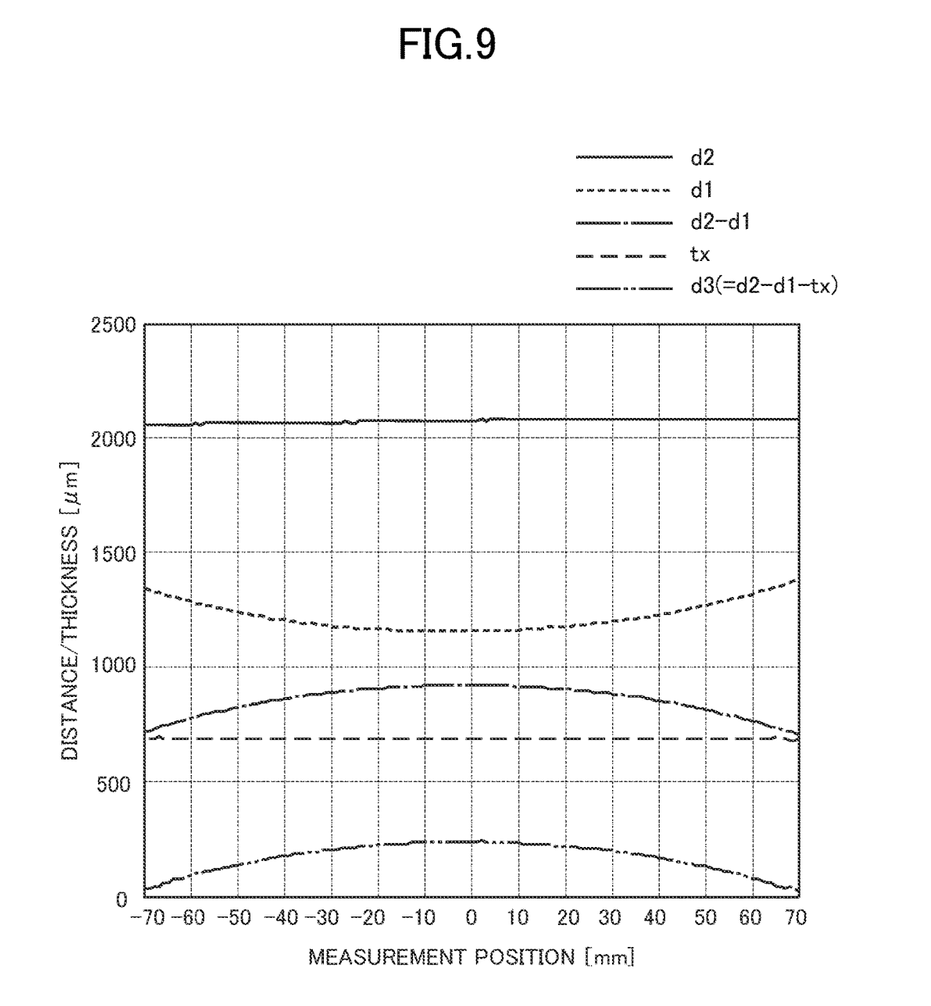
FIG. 9 is a graph for showing a result of measurement by the optical measurement method according to the first embodiment.

FIG. 9 is a graph for showing a result of the measurement by the optical measurement method according to the first embodiment.

In FIG. 9, the solid line indicates the second distance d2, the broken line indicates the first distance d1, and the long broken line indicates the thickness tx of the sample 151. The second distance d2, the first distance d1, and the thickness tx are calculated by the calculator 6 at the plurality of positions in the first direction based on the above-mentioned peak values of the power spectrum.

Further, in FIG. 9, the one-dot chain line indicates information on the front shapes of the sample 151 with respect to the stage 7. Moreover, the two-dot chain line indicates information on the back shapes of the sample 151 with respect to the stage 7, and indicates information on the warp of the sample 151 on the desired segment. The information on the front shapes of the sample 151, which is indicated by the one-dot chain line, can be determined by subtracting the first distance d1 from the second distance d2. Moreover, the information on the back shapes of the sample 151, which is indicated by the two-dot chain line, is the third distance d3 between the sample 151 and the stage 7, and can be determined by subtracting the first distance d1 and the thickness tx from the second distance d2.

As described above, through the calculation of the third distance d3 at the plurality of positions in the first direction, information on the warp of the sample 151 on the desired segment can be acquired.

Further, there may be adopted a method in which, in the first step S001, at least one of the stage 7 or the probe 10 illustrated in FIG. 2A and FIG. 2B is moved not only in the first direction (for example, the X-axis direction or the radial direction of the stage), but also in the second direction (for example, the Y-axis direction or circumferential direction of the stage), which intersects the optical axis direction of the probe 10 and intersects the first direction, and in which the probe 10 irradiates the stage 7 with light to receive the fourth reflected light at the plurality of positions in the first direction and the second direction.

Then, in the third step S003, there may be adopted the method in which at least one of the stage 7 or the probe 10 illustrated in FIG. 2A and FIG. 2B is moved in the first direction and the second direction, and the probe 10 irradiates the sample 151 with light to receive the second reflected light and the third reflected light at the plurality of positions corresponding to the positions at which the fourth reflected light is received.

Through adoption of the above-mentioned method, in the fifth step S005, the calculator 6 calculates the thickness tx of the sample 151, the first distance d1, the second distance d2, and the third distance d3 at the plurality of positions in the first direction and the second direction. As a result, information on the warp of the sample 151 on the desired plane can be acquired.

In the third step S003, there may be adopted a configuration in which, in order for the probe 10 to receive the second reflected light and the third reflected light at the plurality of positions corresponding to the positions at which the fourth reflected light is received, the calculator 6 stores the positions at which the fourth reflected light is received in the first step S001.

Further, the third step S003 may be performed prior to the first step S001. In that case, there may be adopted a configuration in which the calculator 6 stores the positions at which the second reflected light and the third reflected light are received in the third step S003.

Through adoption of the above-mentioned configuration, the light receiving positions in the first step S001 and the light receiving positions in the third step S003 can be associated with each other. In other words, in the third step S003, the second reflected light and the third reflected light can be received at the plurality of positions corresponding to the positions at which the fourth reflected light is received.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An optical measurement apparatus, comprising:
    a probe including a transmissive optical member having a reference surface, the probe being configured to irradiate a sample with light through the reference surface, and to receive a first reflected light from the reference surface, a second reflected light from a front side of the sample, and a third reflected light from a back side of the sample;
    a spectrometer configured to measure a spectrum of measurement reflected light including a first reflection interference light to be generated by the first reflected light and the second reflected light, and a second reflection interference light to be generated by the second reflected light and the third reflected light; and
    a calculator, which is configured to calculate a first distance from the reference surface to the front side of the sample with use of the first reflection interference light, and to calculate a thickness of the sample with use of the second reflection interference light,
    the transmissive optical member having an optical thickness that is larger than an upper limit value of a coherent optical thickness, which is defined by an upper limit value of a measurement wavelength range of the spectrometer and by a wavelength resolution of the spectrometer.

2. The optical measurement apparatus according to claim 1, wherein the light has a wavelength that is transmitted through the sample.

3. The optical measurement apparatus according to claim 1, wherein the optical measurement apparatus is configured to:
    move at least one of a stage having the sample placed thereon or the probe in a first direction;
    irradiate, by the probe, the sample with the light to receive the first reflected light, the second reflected light, and the third reflected light at a plurality of positions in the first direction; and
    calculate, by the calculator, the first distance and the thickness of the sample at the plurality of positions in the first direction.

4. The optical measurement apparatus according to claim 3, wherein the optical measurement apparatus is configured to:
    move at least one of the stage or the probe in a second direction, which intersects the first direction;

irradiate, by the probe, the sample with the light to receive the first reflected light, the second reflected light, and the third reflected light at a plurality of positions in the second direction; and calculate, by the calculator, the first distance and the thickness of the sample at the plurality of positions in the second direction.

5. An optical measurement apparatus, comprising:

a probe including a transmissive optical member having a reference surface, the probe being configured to irradiate a sample with light through the reference surface, and to receive a first reflected light from the reference surface, a second reflected light from a front side of the sample, and a third reflected light from a back side of the sample; and a calculator, which is configured to calculate a first distance from the reference surface to the front side of the sample with use of a first reflection interference light to be generated by the first reflected light and the second reflected light, and to calculate a thickness of the sample with use of a second reflection interference light to be generated by the second reflected light and the third reflected light, the optical measurement apparatus being configured to:
irradiate, under a state in which the sample is not placed on a stage, by the probe, the stage with the light through the reference surface to receive the first reflected light, and a fourth reflected light from a surface of the stage;

calculate, by the calculator, a second distance from the reference surface to the stage with use of a third reflection interference light to be generated by the first reflected light and the fourth reflected light; and calculate, by the calculator, a third distance between the back side of the sample and the stage with the second distance being an additive element, and with the first distance and the thickness of the sample being subtractive elements.

6. The optical measurement apparatus according to claim 5, wherein the optical measurement apparatus is configured to, under the state in which the sample is not placed on the stage:

move at least one of the stage or the probe in a first direction; and irradiate, by the probe, the stage with the light to receive the first reflected light and the fourth reflected light at a plurality of positions in the first direction, wherein the optical measurement apparatus is configured to, under a state in which the sample is placed on the stage, move at least one of the stage or the probe in the first direction; and irradiate, by the probe, the sample with the light to receive the first reflected light, the second reflected light, and the third reflected light at a plurality of positions corresponding to the plurality of positions at which the fourth reflected light is received, and calculate, by the calculator, the thickness of the sample, the first distance, the second distance, and the third distance at the plurality of positions in the first direction.

7. The optical measurement apparatus according to claim 6, wherein the optical measurement apparatus is configured to, under the state in which the sample is not placed on the stage:

move at least one of the stage or the probe in a second direction, which intersects the first direction; and irradiate, by the probe, the stage with the light to receive the first reflected light and the fourth reflected light at a plurality of positions in the second direction, wherein the optical measurement apparatus is configured to, under the state in which the sample is placed on the stage, move at least one of the stage or the probe in the second direction; and irradiate, by the probe, the sample with the light to receive the first reflected light, the second reflected light, and the third reflected light at a plurality of positions corresponding to the plurality of positions at which the fourth reflected light is received, and calculate, by the calculator, the thickness of the sample, the first distance, the second distance, and the third distance at the plurality of positions in the second direction.

8. The optical measurement apparatus according to claim 5, further comprising a spectrometer, which is configured to measure a spectrum of measurement reflected light including the first reflection interference light and the second reflection interference light, and to output a result of the measurement to the calculator, wherein the transmissive optical member has an optical thickness that is larger than an upper limit value of a coherent optical thickness, which is defined by an upper limit value of a measurement wavelength range of the spectrometer and by a wavelength resolution of the spectrometer.

9. An optical measurement method, which is performed with use of a probe including a transmissive optical member having a reference surface, and a spectrometer, the optical measurement method comprising:

irradiating a sample with light through the reference surface with use of the probe;

receiving, by the probe, a first reflected light from the reference surface, a second reflected light from a front side of the sample, and a third reflected light from a back side of the sample;

measuring, with use of the spectrometer, a spectrum of measurement reflected light including a first reflection interference light to be generated by the first reflected light and the second reflected light, and a second reflection interference light to be generated by the second reflected light and the third reflected light; and calculating a first distance from the reference surface to the front side of the sample with use of the first reflection interference light, and calculating a thickness of the sample with use of the second reflection interference light, the transmissive optical member having an optical thickness that is larger than an upper limit value of a coherent optical thickness, which is defined by an upper limit value of a measurement wavelength range of the spectrometer and by a wavelength resolution of the spectrometer.

10. The optical measuring method according to claim 9, wherein the light has a wavelength that is transmitted through the sample.

11. The optical measuring method according to claim 9, further comprising:

moving at least one of a stage, on which the sample is placed, or the probe in a first direction;

irradiating, by the probe, the sample with the light to receive, by the probe, the first reflected light, the second reflected light, and the third reflected light at a plurality of positions in the first direction; and calculating the first distance and the thickness of the sample at the plurality of positions in the first direction.

12. The optical measuring method according to claim 11, further comprising:

moving at least one of the stage or the probe in a second direction, which intersects the first direction;

irradiating, by the probe, the sample with the light to receive, by the probe, the first reflected light, the second reflected light, and the third reflected light at a plurality of positions in the second direction; and calculating the first distance and the thickness of the sample at the plurality of positions in the second direction.

13. An optical measurement method, which is performed with use of a probe including a transmissive optical member having a reference surface, the optical measurement method comprising:

irradiating a sample with light through the reference surface with use of the probe;

receiving, by the probe, a first reflected light from the reference surface, a second reflected light from a front side of the sample, and a third reflected light from a back side of the sample;

calculating a first distance from the reference surface to the sample with use of a first reflection interference light to be generated by the first reflected light and the second reflected light, and calculating a thickness of the sample with use of a second reflection interference light to be generated by the second reflected light and the third reflected light;

irradiating, under a state in which the sample is not placed on a stage, the stage with the light through the reference surface with use of the probe to receive, by the probe, the first reflected light, and a fourth reflected light from a surface of the stage;

calculating a second distance from the reference surface to the stage with use of a third reflection interference light to be generated by the first reflected light and the fourth reflected light; and calculating a third distance between the back side of the sample and the stage with the second distance being an additive element, and with the first distance and the thickness of the sample being subtractive elements.

14. The optical measuring method according to claim 13, further comprising:

moving, under the state in which the sample is not placed on the stage, at least one of the stage or the probe in a first direction;

irradiating, by the probe, under the state in which the sample is not placed on the stage, the stage with the light to receive, by the probe, the first reflected light and the fourth reflected light at a plurality of positions in the first direction;

moving, under a state in which the sample is placed on the stage, at least one of the stage or the probe in the first direction;

irradiating, by the probe, under the state in which the sample is placed on the stage, the sample with the light to receive, by the probe, the first reflected light, the second reflected light, and the third reflected light at a plurality of positions corresponding to the plurality of positions at which the fourth reflected light is received; and calculating the thickness of the sample, the first distance, the second distance, and the third distance at the plurality of positions in the first direction.

15. The optical measuring method according to claim 14, further comprising:

moving, under the state in which the sample is not placed on the stage, at least one of the stage or the probe in a second direction, which intersects the first direction;

irradiating, by the probe, under the state in which the sample is not placed on the stage, the stage with the light to receive, by the probe, the first reflected light and the fourth reflected light at a plurality of positions in the second direction;

moving, under the state in which the sample is placed on the stage, at least one of the stage or the probe in the second direction;

irradiating, by the probe, under the state in which the sample is placed on the stage, the sample with the light to receive, by the probe, the first reflected light, the second reflected light, and the third reflected light at a plurality of positions corresponding to the plurality of positions at which the fourth reflected light is received; and calculating the thickness of the sample, the first distance, the second distance, and the third distance at the plurality of positions in the second direction.

16. The optical measurement method according to claim 13, further comprising measuring a spectrum of measurement reflected light including the first reflection interference light and the second reflection interference light with use of a spectrometer, wherein the transmissive optical member has an optical thickness that is larger than an upper limit value of a coherent optical thickness, which is defined by an upper limit value of a measurement wavelength range of the spectrometer and by a wavelength resolution of the spectrometer.

* * * * *